(12) United States Patent
Rapp

(10) Patent No.: US 9,333,982 B1
(45) Date of Patent: May 10, 2016

(54) SKIING APPARATUS

(71) Applicant: Jeff Rapp, Boyce, LA (US)

(72) Inventor: Jeff Rapp, Boyce, LA (US)

(73) Assignee: Jeff Rapp, Boyce, LA (US)

( * ) Notice: Subject to any disclaimer, the term of this patent is extended or adjusted under 35 U.S.C. 154(b) by 0 days.

(21) Appl. No.: 14/523,416

(22) Filed: Oct. 24, 2014

(51) Int. Cl.
  *A63C 17/02* (2006.01)
  *B62B 13/00* (2006.01)
  *B62B 17/06* (2006.01)

(52) U.S. Cl.
  CPC ............. *B62B 13/005* (2013.01); *B62B 17/062* (2013.01); *B62B 17/063* (2013.01)

(58) Field of Classification Search
  CPC ........ B62B 13/00; B62B 13/08; B62B 13/04; B62B 17/065
  USPC ............................................. 280/16, 20, 20.1
  See application file for complete search history.

(56) References Cited

U.S. PATENT DOCUMENTS

| | | | |
|---|---|---|---|
| 1,672,782 A | 6/1928 | Ring | |
| 2,188,080 A | 1/1940 | Grimm | |
| 2,256,203 A | 9/1941 | Hyian | |
| 2,479,674 A | 8/1949 | Elliott | |
| 2,528,397 A * | 10/1950 | Stof | 280/16 |
| 3,178,196 A | 4/1965 | Colace | |
| D205,296 S | 7/1966 | Cohen | |
| 3,561,783 A | 2/1971 | Ellett | |
| 3,588,138 A * | 6/1971 | Cerny | 280/16 |
| 3,717,359 A | 2/1973 | Peronnon et al. | |
| 3,778,077 A | 12/1973 | Johnson | |
| 3,830,513 A | 8/1974 | Hunt | |
| 3,870,329 A * | 3/1975 | Evequoz | 280/16 |
| 3,900,208 A | 8/1975 | Hjelmquist | |
| 3,917,301 A | 11/1975 | Fabris | |
| 4,097,055 A * | 6/1978 | Laycraft | 280/16 |
| D254,363 S | 3/1980 | Joyce | |
| 4,193,609 A | 3/1980 | Bissett | |
| 4,199,162 A | 4/1980 | Joy | |
| 4,324,409 A | 4/1982 | Larsen et al. | |
| 4,865,572 A | 9/1989 | Andes | |
| 4,886,283 A | 12/1989 | Wells | |
| 5,566,959 A | 10/1996 | Tiramani | |
| D389,210 S | 1/1998 | Goodman | |
| 6,019,380 A | 2/2000 | Goodman et al. | |
| 6,036,202 A | 3/2000 | LaCome | |
| 6,179,305 B1 | 1/2001 | Capozzi | |
| D446,474 S | 8/2001 | Monike et al. | |
| 6,736,414 B2 * | 5/2004 | Farrally-Plourde | 280/16 |
| 6,783,134 B2 | 8/2004 | Geary | |
| 6,969,074 B2 | 11/2005 | Piper | |
| 6,997,465 B2 | 2/2006 | Jungnickel | |
| 7,240,908 B2 | 7/2007 | Sankrithi | |
| 7,374,180 B2 | 5/2008 | Farmer | |
| 7,547,023 B2 | 6/2009 | Yau | |
| 8,308,172 B2 | 11/2012 | Gulbranson | |
| 8,398,094 B1 | 3/2013 | Kolesar | |
| 2001/0038184 A1 | 11/2001 | Stafford | |
| 2004/0100044 A1 | 5/2004 | Monike et al. | |

(Continued)

*Primary Examiner* — John Walters
*Assistant Examiner* — James Triggs
(74) *Attorney, Agent, or Firm* — Mark Malek; Widerman Malek, PL; Kelly Swartz

(57) ABSTRACT

A snow skiing apparatus which may include an upper frame member, a lower seat member connected to the upper frame member, a handle member connected to the upper frame member, a lower frame member connected to the upper frame member, and a ski attachment member connected to the lower frame member and adapted to be detachably connected to a ski.

19 Claims, 9 Drawing Sheets

(56) References Cited

U.S. PATENT DOCUMENTS

| | | |
|---|---|---|
| 2005/0001391 A1 | 1/2005 | Piper |
| 2007/0267827 A1* | 11/2007 | Lasala ................... 280/14.28 |
| 2009/0014995 A1 | 1/2009 | Gulbrandson |
| 2009/0140503 A1 | 6/2009 | Kolesar |
| 2009/0230641 A1 | 9/2009 | Eugenio |
| 2010/0109267 A1 | 5/2010 | Leycraft |

* cited by examiner

SKIING APPARATUS

FIELD OF THE INVENTION

The present invention relates to a snow skiing apparatus. In particular, the present invention relates to a snow skiing apparatus that a user may ride on in the manner of a skiing bicycle.

BACKGROUND

Traditionally, snow skiing apparatuses have been complicated and thus expensive to build and maintain. Additionally, the small range of movement between the seat and the ski may render the skiing apparatus unsuitable for certain uses and terrains.

Traditional ski bikes normally have a seat of some kind on which the user sits and include two skis, a front ski and a back ski. The front ski is normally rotatable through the use of a rotatable handle bar attached to the frame so as to aid in turning the ski bike. If the seat is movable in relationship to one or more of the skis, the movement range during operation is normally quite limited and cannot absorb large impacts and changes in terrain.

Some other ski bikes may have a single ski to which the ski bike frame is attached at multiple points and/or only allow very limited movement of the ski in relationship to the seat. This severely limits the terrain on which the ski bikes may comfortably operate and the ability of the ski bike to absorb ground impacts. These designs also tend to be quite complex and expensive to manufacture.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a skiing apparatus which may provide a greater ability of users to ski and also provide enhanced suspension dampening features. Embodiments of the present invention may also advantageously allow for a modular design so that skis may be easily changed. The skiing apparatus according to embodiments of the present invention may also advantageously allow for efficient transportation for users, as well as ease of manufacture of the skiing apparatus.

These and other objects, features and advantages according to embodiments of the present invention may be provided by a skiing apparatus including an upper frame member, a lower seat member connected to the upper frame member, a handle member connected to the upper frame member, a lower frame member connected to the upper frame member, and a ski attachment member connected to the lower frame member and adapted to be detachably connected to a ski.

In some embodiments the skiing apparatus may include an upper shock absorbing connector member connected to the upper frame member and a lower shock absorbing connector member connected to the lower frame member. In addition, the skiing apparatus may include a shock absorbing member extending between the lower frame member and the upper frame member. The shock absorbing member may also include an upper end adapted to be connected to the upper shock absorbing connector member, and a lower end adapted to be connected to the lower shock absorbing member. Further, the upper shock absorbing connector may include a first portion adapted to be connected to the upper frame member and a pair of second portions that extend outwardly from the first portion. Each of the pair of second portions may include a plurality of spaced apart pairs of aligned passageways formed therethrough, such that each of the plurality of spaced apart pairs of aligned passageways may be adapted to receive a portion of the upper end of the shock absorbing member.

In some embodiments, the lower shock absorbing connector may include a first portion adapted to be connected to the lower frame member and a pair of second portions that extend upwardly from the first portion. Each of the pair of second portions may include a plurality of spaced apart pairs of aligned passageways formed therethrough. Each of the plurality of spaced apart pairs of aligned passageways may be adapted to receive a portion of the lower end of the shock absorbing member. In addition, the upper end of the shock absorbing member may be pivotally connected to the upper shock absorbing connector. Further, the lower end of the shock absorbing member may be pivotally connected to the lower shock absorbing connector.

In some embodiments, the upper frame member may be pivotally connected to the lower frame member, and the seat may be fixedly connected to the lower seat member. Further, the ski attachment member may be fixedly connected to the lower frame member.

The skiing apparatus may also include a brace member extending between a portion of the upper shock absorbing connector and the lower seat member. In some exemplary embodiments, the ski attachment member may be adapted to be detachably connected to a ski binding of the ski. Additionally, the handle member may be fixed in relation to the lower seat member. Further, in some embodiments, the upper frame and lower frame may be pivotally connected so as to allow between about 2 and 40 degrees of movement therebetween. In some embodiments of the skiing apparatus according to the present invention, the upper frame member and the lower seat member may be integrally formed as a monolithic unit.

In addition, some embodiments may include a foot ski assembly. The foot ski assembly may include a foot ski, and a gas spring strut, an end of the gas spring strut being connected to the foot ski and the other end of the gas spring strut being connected by multiple ball joints to the lower frame member between the ski attachment member and the upper member.

DETAILED DESCRIPTION OF THE INVENTION

Figure 1:
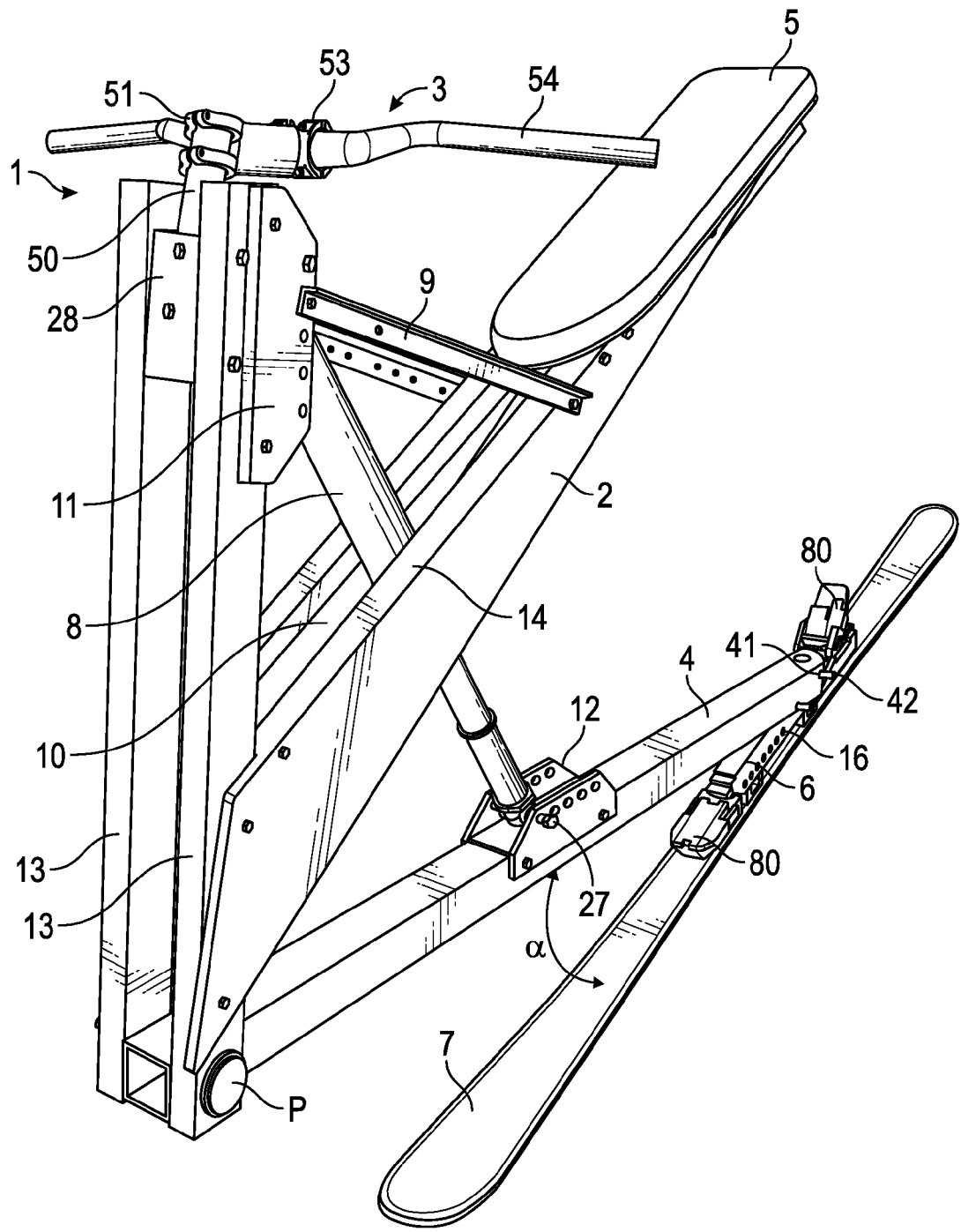
FIG. 1 is a perspective view of a skiing apparatus according to an embodiment of the present invention connected to a ski.
Figure 2:
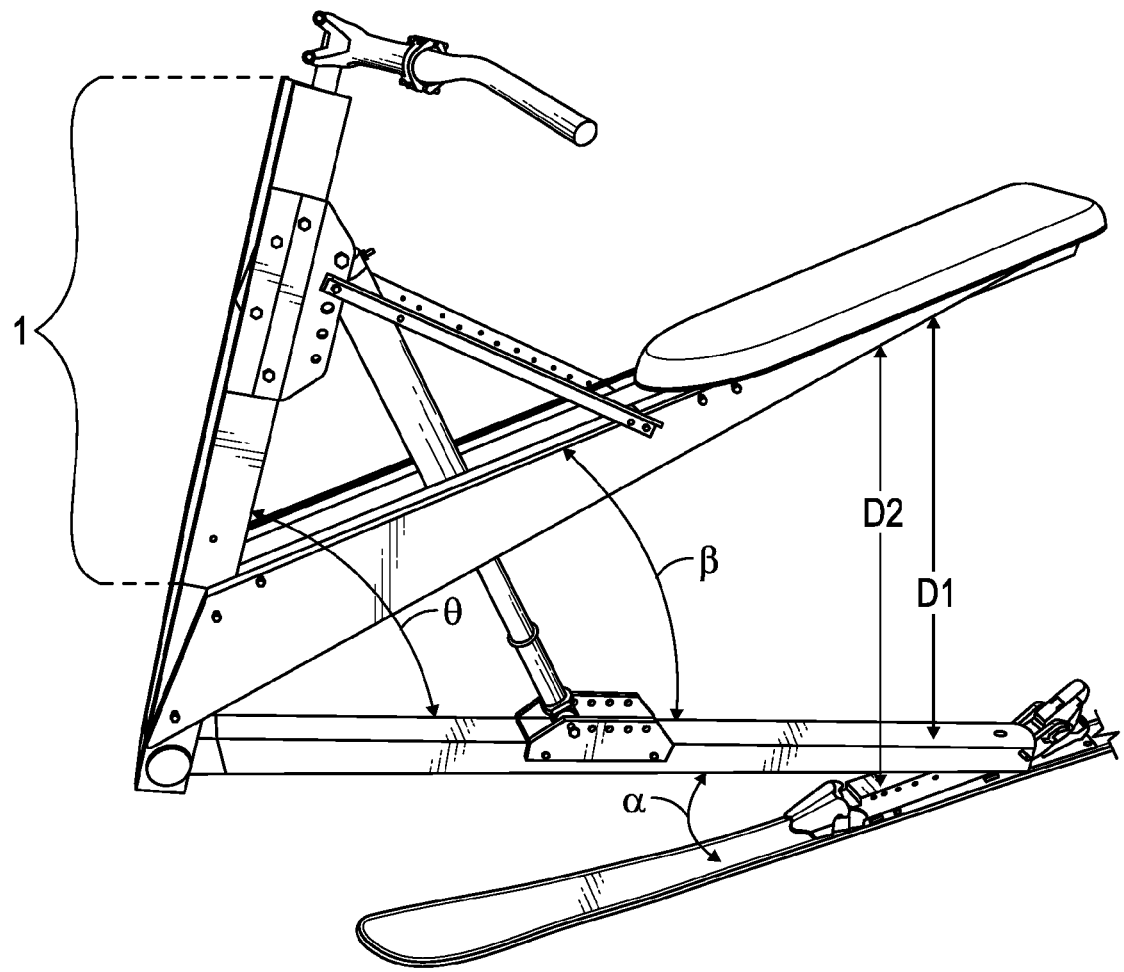
FIG. 2 is another perspective view of the skiing apparatus illustrated in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout. Prime notation is used to identify similar elements in different embodiments.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

As illustrated in FIGS. 1-9, exemplary embodiments of the invention are directed to a snow skiing apparatus 100. As can be seen, for example, in FIGS. 1 and 2, the skiing apparatus 100 may include an upper frame member 1, a lower seat member 2 connected to the upper frame member 1, a handle member 3 connected to the upper frame member 1, and a lower frame member 4 connected to the upper frame member 1.

The lower seat member 2 may include a seat 5. The type of seat is not particularly limited and the seat 5 may be adjustable forward, backward, up and down, or angled relative to the lower seat member 2. More specifically, and although not illustrated in the appended figures, those skilled in the art will appreciate that the seat 5 may be slidably connected to the lower seat member 2 so that the seat 5 may be laterally moveable with respect to the lower seat member 2 to thereby adjust the positioning of the seat 5. Further, the seat 5 may be mounted to the lower seat member 2 on a mechanism that allows for the seat to be longitudinally moved with respect to the lower seat member 2. Accordingly, it is to be understood by those skilled in the art that the seat 5 may be both longitudinally and laterally moved with respect to the lower seat member 2. Additionally, the seat 5 may be mounted to the lower seat member 2 on a mechanism that allows for the seat 5 to be positioned at an angle relative to the lower seat member 2, such that the seat 5 is non-parallel with the lower seat member 2. The seat 5 may also be attached to the lower seat member 2 through one or more intermediate attachment members and may include an elastic and/or dampening member. For instance, the seat 5 may include a dampening or elastic material that will give in one or more directions so as to absorb vibration and force which are transferred through the skiing apparatus 100 and provide a more comfortable ride for the user. The design of the intermediate attachment members is not particularly limited. For instance, the intermediate attachment members may be similar to the shock absorbing mounts used on some bicycle seats, may include a solid piece of rubber or other material between mounting brackets, etc.

The lower frame member 4 can include a ski attachment member 6 configured to attach to a ski 7. In an exemplary embodiment, the ski attachment member 6 may be adapted to be attached to the ski boot bindings 80 of the ski 7. The angle $\alpha$ of pivot range between the ski 7 and the lower frame member 4 may be adjustable. For example, the angle $\alpha$ may have a range of 10 to 20 degrees.

Additionally, the lower frame member 4 may be configured to have any shape. The configuration of the lower frame member 4 may facilitate the attachment thereto of the ski attachment member 6, the upper frame member 1, and any other element of the skiing apparatus 100 as may be desirously attached. In the present embodiment, the lower frame member has a generally rectangular, more specifically square, tubular shape. Although a generally rectangular/tubular shape is illustrated in the appended figures, those skilled in the art will appreciate that many other shapes may be provided while carrying out the goals, features and objectives according to embodiments of the present invention. More specifically, it is contemplated that the lower frame member may be provided by ovular shape to the members, or any other shape that may provide similar strength properties as may be understood by those skilled in the art after having had the benefit of reading this disclosure. The configuration of the lower frame member 4 may minimize the weight thereof while providing sufficient structural integrity to support the weight of the user as well as forces exerted upon the lower frame member 4 while in use. The lower frame member 4 may be formed of any appropriate material, including, but not limited to, metals, metal alloys, polymers, composite materials, carbon-based materials, such as carbon fiber, and the like.

The method of adjusting the pivot range is not particularly limited. For instance, the ski attachment member 6 may have a plurality of through holes 16 which match with through holes 41 and fasteners 42 in the lower frame member 4, through a toothed cam locking mechanism, or any other desired method. It is also contemplated that the pivot range can be adjusted through manipulation of the ski attachment member 6 alone. For instance, the ski attachment member 6 may have a hinged portion with a plurality of matching through holes which may be secured at various positions with a locking member, and may utilize a tooth cam mechanism, or any other desired method of adjustment.

In addition, the relative position of the ski 7 and/or the ski attachment member 6 may be adjusted relative to the lower frame member 4 (e.g., in the front and back direction). This may be done through a plurality of mounting holes 16, 41 and fasteners 41, a rail system, a positioning screw system, or any other desired method. The relative movement may allow the ski attachment member 6 to be adjustable relative to the lower frame member 4, and thus relative to seat 5, so as to allow the relative front/back location of the ski 7 to be configured with relation to the seat 5 at a given angle theta between the upper frame member 1 and the lower frame member 4.

The skiing apparatus 100 may also include a shock absorbing member 8 which reacts to relative movement between the upper frame member 1 and the lower frame member 4. The shock absorbing member 8 may be a shock absorber, a spring/elastic member, etc., connected to both the upper frame member 1 and the lower frame member 4. The shock absorbing member 8 may be a piston shock absorber as illustrated in FIG. 1, or may be a cylindrical hub (or other shape) located at the pivot point P where the upper frame member 1 connects to the lower frame member 4.

In some embodiments, the shock absorbing member 8 may be the member which connects the upper frame member 1 to the lower frame member 4 at the point of flexure. For instance, the shock absorbing member 8 may be an elastic matrix connected to the lower portion of the upper frame member 1 and the side of the lower frame member 4 opposite the ski attachment member 6 side so that the relative movement between the upper frame member 1 and the lower frame member 4 is conducted through the flexing of the elastic member.

The method of attaching the shock absorbing member 8 to the upper and lower frame members 1 and 4 is not particularly limited. For instance, the shock absorbing member 8 may be directly attached to the upper frame member 1, for example pivotally connected between columns 13, and the lower frame member 4, and/or may be attached through one or more intermediate members such as the upper shock absorbing connector member 11 and/or the lower shock absorbing member connector 12. As will be described below, the method of connecting the shock absorbing member to the upper frame and lower frame is not particularly limited. For instance, the shock absorbing member may be connected with connectors such as pins, bolts, etc. 19 through a pivotable bushing/ball or other connection point 23 on the shock absorber 8. The connectors may connect to passages or holes 18 in upper shock absorbing connector member 11 or may be connected directly using through holes in the columns 13. Upper shock absorbing connector members 11 may be connected to columns 13 though a use of passageways and pins/bolts and may allow relative adjustment along the length of columns 13, or may be directly welded to the columns 13.

Figure 3:
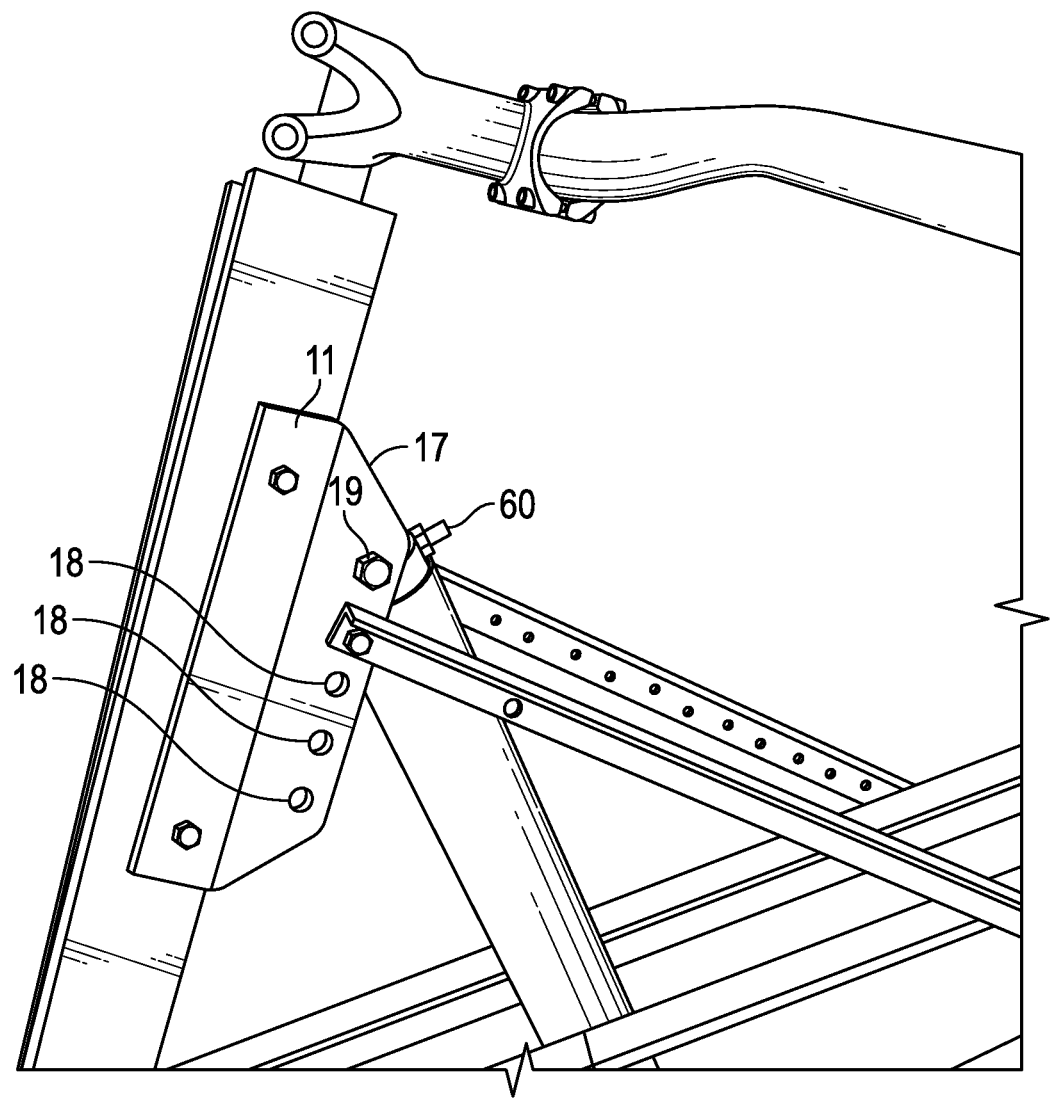
FIG. 3 is a partial perspective view of the skiing apparatus illustrated in FIG. 1 and showing an upper shock absorbing connector member.
Figure 4:
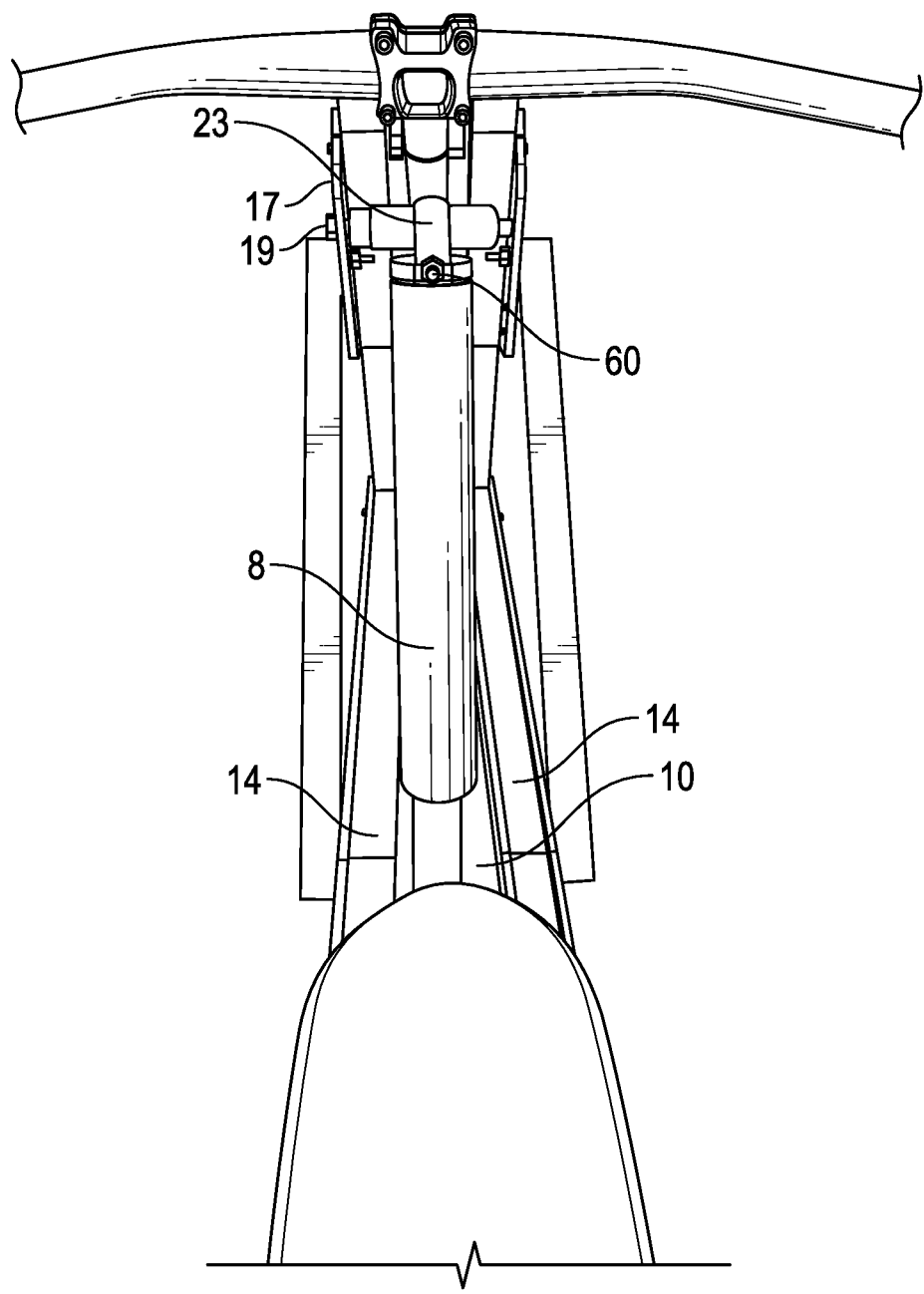
FIG. 4 is a partial top view of the skiing apparatus illustrated in FIG. 1.

As illustrated in FIGS. 3 and 4, the upper shock absorbing connector member 11 may include an upper pair of walls 17 attached to the upper frame member 1. The upper pair of walls 17 may be attached to the outer sides of the upper frame member 1. It is contemplated that, in some embodiments, the upper pair of walls 17 may be attached to the back (e.g., the side which faces the seat) of the upper frame member 1, and/or to each other, through a center wall (not shown). In some embodiments, the upper pair of walls 17 may be attached to the inside walls of columns 13 or to both the inside and outside walls of columns 13 though the use of a U-shaped mounting portion (not shown).

The upper shock absorbing connector member 11 may have multiple possible connection points where the shock absorbing member 8 can connect. For instance, the upper shock absorbing connector member 11 may have a plurality of holes 18 through which a shaft member 19 may connect a top connector 23 of the shock absorbing member 8 to the upper shock absorbing connector member 11. Using the different holes 18 which are placed, for instance, along a length of the walls 15, the placement of the shock absorbing member 8 may be adjusted.

Figure 5:
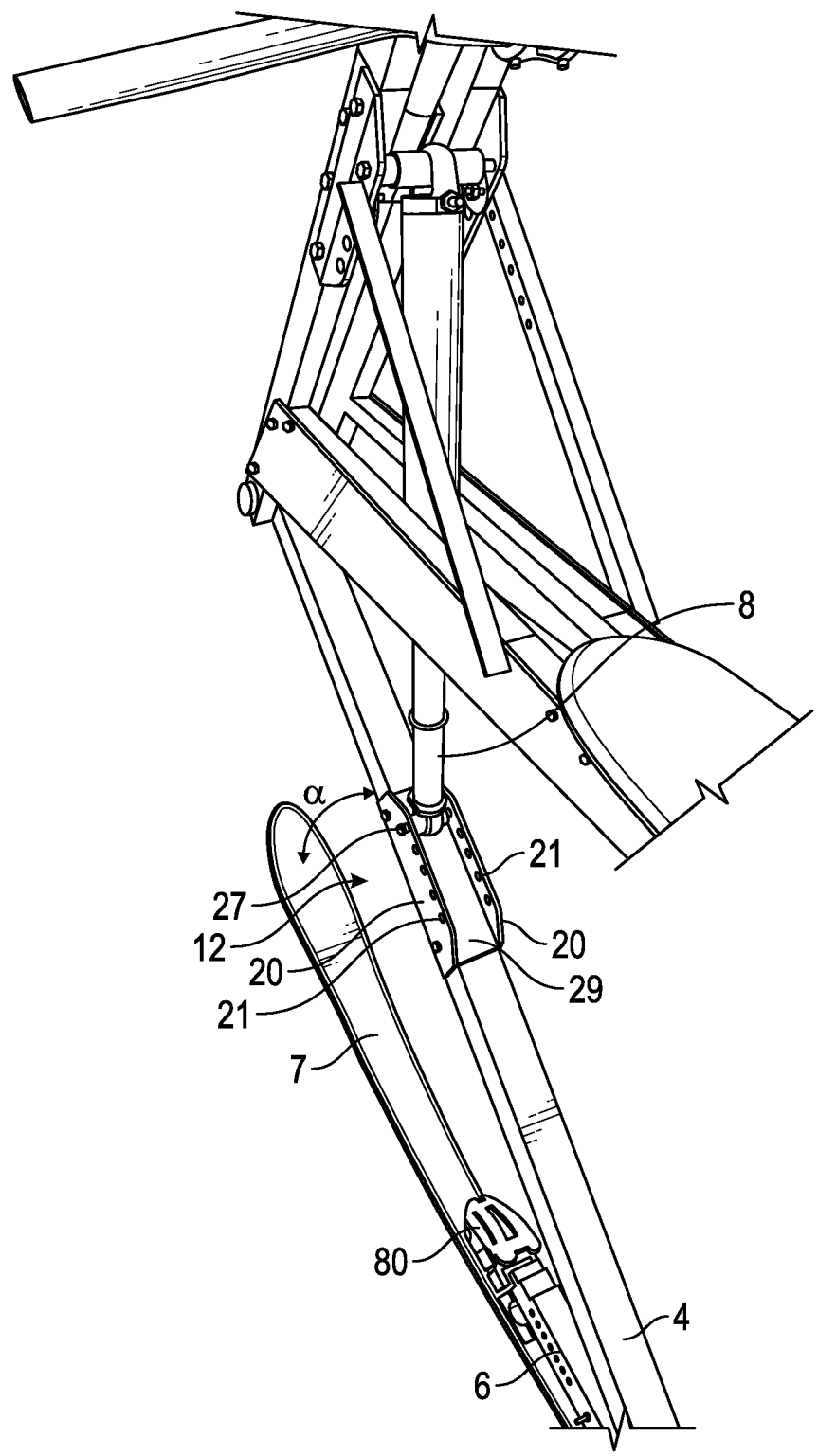
FIG. 5 is a partial perspective view of the skiing apparatus illustrated in FIG. 1.
Figure 6:
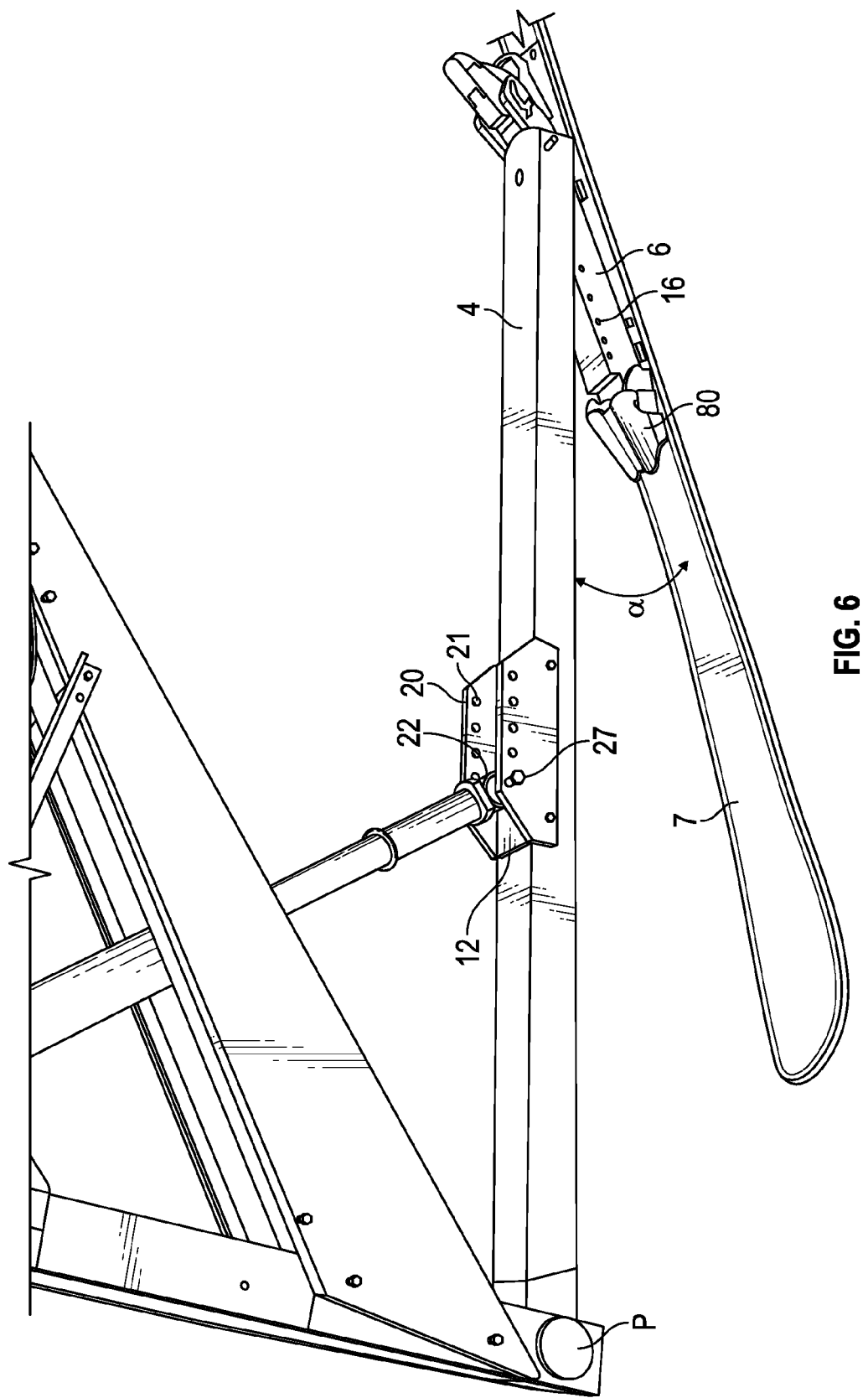
FIG. 6 is a partial perspective view of a lower portion of the skiing apparatus illustrated in FIG. 1.

As perhaps best illustrated in FIGS. 5 and 6, the lower shock absorbing connector member 12 may include a pair of walls 20 attached to the lower frame member 4. The pair of walls 20 may be attached to the outer sides of the lower frame member 4. In some embodiments, the pair of walls 20 may be attached to (or abut through a center connecting portion, or base 29) the top (e.g., the side which faces the seat) of the lower frame member 4.

The lower shock absorbing connector member 12 will now be discussed in greater detail with additional reference to FIGS. 5 and 6. More particularly, the lower shock absorbing connector member 12 may be characterized by a length of channel level. The lower shock absorbing connector member 12 may include a base member 29 that is adapted to engage the lower frame member 4. A pair of opposing sidewalls 20 are connected to the base member 29 and have portions that extend upwardly and downwardly therefrom. The sidewalls including plurality of pin receiving passageways 21 formed therethrough. More specifically, the pin receiving passageway 21 formed on each of the opposing sidewalls 20 are preferably aligned with one another so that bolt 27 may be passed therethrough to lock the shock absorbing member 8 into a position with respect to the lower shock absorbing connector member 12.

As perhaps also best illustrated in FIGS. 5 and 6, the shock absorbing connector member 12 also includes a pair of lower connector member receiving passageways that are adapted to receive connectors to be passed therethrough and through the lower frame member 4. More specifically, it is contemplated that a plurality of passageways are positioned along the wall portions of the lower frame member 4 that can be aligned with the lower connector member receiving passageways so that a connector, i.e., a pin, a nut/bolt combination, or some other type of connector as understood by those skilled in the art, may be passed through the lower connector member receiving passageways and the passageways formed in the lower frame member 4 thereby attach the shock absorbing connector member 12 to the lower frame member 4.

As indicated above, the lower shock absorbing connector member 12 may have multiple possible connection points where the shock absorbing member 8 may connect thereto. For instance, the lower shock absorbing connector member 12 may include a plurality of passageways 21 through which a bolt 27 (or other connector) may connect a bottom connector 22 (illustrated in FIG. 6) of the shock absorbing member 8 to the lower shock absorbing connector member 12. Using the different passageways 21 located, for instance, along a length of the pair of sidewalls 20, the placement of the shock absorbing member 8 may be adjusted. More specifically, adjusting the position of the shock absorbing member 8 between the various passageways 21 advantageously allows for the positioning angle and height of the seat member to be changed. Further, moving the position of the shock absorbing member 8 along the shock absorbing member connector 12 can provide for a different type of ride for the user, i.e., a more rigid ride, or a smoother ride. This advantageously allows for a user to make an adjustment to the positioning of the shock absorbing member 8 to allow for a customized ride and customizable comfort positioning with respect to the distance between the seat 5 and the ground.

While the mechanism for adjusting the location of the shock absorber member 8 on the upper and lower frames 1 and 4 is described as utilizing a plurality of passageways 18 and 21, respectively, the upper and lower shock absorbing connector members 11, 12 may use a slot with grooves, a rail, a positioning screw, or any other appropriate mechanism. In addition, the upper and lower shock absorber connector members 11, 12 may also be moveable relative to the upper frame 1 and lower frame 4, respectively, through the use of a plurality of fixing holes, a rail, positioning screw, or any other suitable method.

As noted above, the upper frame member 1 and the lower frame member 4 are movable relative to one another. In some embodiments, the upper frame member 1 may be pivotally connected to the lower frame member 4 (e.g., at pivot point P illustrated in FIG. 6). The angle of allowable movement between the upper frame member 1 and the lower frame member 4, when the skiing apparatus is assembled, may have an angle θ in a range from 35 to 80 degrees. The angle of allowable movement between the lower frame member 4 and a top side of the lower seat member 2, when the skiing apparatus is assembled, may have an angle 13 in a range from 0 to 45 degrees. The relative movement between the seat 5 and the ski attachment member 6 may be a distance D1 having a range of 2 to 36 inches. This relative movement between the seat 5 and the ski attachment member 6 may allow the distance D2 between the ski 7 at the attachment member and the seat 5 to be in a range of 2 to 38 inches.

A large range of motion between the seat 5 and ski 7 may allow the user to traverse uneven terrain, such as moguls, by allowing sufficient dampening while still maintaining control. In addition, the large range of motion may also allow more variation in the compression and rebound dampening characteristics of the shock absorbing member 8. This may allow a smoother and more responsive ride by enabling varying stiffness and dampening characteristics along the range of motion.

In some embodiments, the shock absorbing member 8 may include a multistage adjustable resistance shock absorber. The shock absorbing member 8 may be adjusted at one or more adjustment members 60. For instance, the shock absorbing member 8 may include a multiple adjustment shock member, such as an air bypass shock absorber, which is capable of providing different dampening and recovery/resistance characteristics at different points on the shock absorber's stroke. By so doing, this may enable custom tuning of the skiing apparatus's ride. Indeed, the resistance and dampening provided by the shock absorbing member 8 may be adjusted without the need to change parts or modify the skiing apparatus so that adjustments may be made while the skiing apparatus is in use or between runs.

For example, compression dampening may be adjusted to decrease as the shock absorbing member 8 is extended so as to compress freely when fully extended, have moderate characteristics in mid-stroke for a comfortable or responsive ride, and increase greatly when the shock absorbing member 8 is close to being fully compressed, so as to provide enough resistance to not bottom out and provide appropriate resistance and ride characteristics during moguls, jumps, etc. Additionally, rebound dampening may be adjusted to maximally increase as the shock absorbing member 8 fully extends, thus limiting the amount of return force experienced by the rider.

The number of adjustment ranges, and the resistance and damping thereof, is not particularly limited and may be configured based the individual user, the conditions and environment, the desired use of the skiing apparatus, the desired ride characteristics, etc. The relative dampening/resistance provided by the shock absorbing member 8 may vary continuously (e.g., linearly, non-linearly, exponentially, etc.) over the entire range of motion, or a portion thereof, so that the dampening and return force can be smoothly changed as the relative position/angle between the upper frame member 1 and the lower frame 4 changes. In some embodiments, the dampening and/ or resistance between the upper frame 1 and the lower frame 4 may be constant over the full range of motion, or a portion thereof.

The lower seat member 2 is connectable to the upper frame member 1. More specifically, the lower seat member 2 may include a pair of opposing beam members 14 that, when connected to the upper frame member 1, extend outwardly therefrom. As will be discussed in greater detail below, the upper frame member 1 may include a pair of opposing column members 13. As perhaps best illustrated in FIG. 1, the pair of opposing beam members 14 may have an L-shaped end portion that is adapted to immediately engage a lower portion of each of the opposing column members 13. More specifically, passageways may be formed through end portions of each of the opposing beam members 14. Passageways may also be formed through lower portions of each of the opposing column members 13. The passageways formed through the end portions of each of the opposing beam members 14 at each of the opposing column members 13 may be aligned so that a connection may be made between the column members 13 and the beam members 14. The connection between the beam members 14 and the column numbers 13 may be made using fasteners/connectors such as, for example, a nut/bolt or a pin connector, or any other type of connector that may be understood by the skilled artisan. While the above exemplary embodiments describe the use of connecting members such as bolts, the opposing column members 13 may be connected to the beam members 14 through any form of welding or other appropriate attachment method as desired.

Although the lower seat member 2 is illustrated as having a pair of opposing beam members 14, those skilled in the art will appreciate that the beam members 14 may be provided by a monolithic unit, i.e., the lower seat member 2 may be a one piece unit that provides for a slot 10 formed between the beam members 14. The slot 10 is preferably sized to allow for the shock absorbing member 8 to freely move between the beam members 14.

The connection of the lower seat member 2 to the upper frame member 1 at a lower end of the upper frame member 1 may advantageously reduce force that may be exerted at the connection between the upper frame member 1 and the lower frame member 4 resulting from force applied to the lower seat member 2.

An exemplary embodiment of the skiing apparatus 100, as illustrated in FIG. 1, may include one or more braces 9 connecting the upper frame member 1 and the lower seat member 2. Each of the braces 9 may be configured so as to restrict relative motion between the upper frame member 1 and the lower seat member 2, and provide increased structural support to the skiing apparatus 100. The brace 9 may include a pair of braces 9 on either side of the shock absorbing member 8. The braces 9 may illustratively be provided by an elongate L-shaped member that has a plurality of passageways formed through wall portions thereof. The passageways formed through the wall portions of each of the braces 9 may advantageously be aligned with passageways are formed through a sidewall of an upper shock absorbing connector member 11, which will be described in greater detail below. Accordingly, the angle between the upper frame member 1 and the lower seat member 2 may also be adjusted by aligning the passageways formed through each of the braces 9 with the passageways formed through the upper shock absorbing connector member 11. Further, those skilled in the art will appreciate that each of the braces 9 may be connected to the lower seat member 2 on a first end and the upper shock absorbing connector member 11 on a second (and opposing) end using a variety of connectors including, but not limited to, a nut/bolt connector, a pin connector, or any other type of connector that may be understood by those skilled in the art after having had the benefit of reading this disclosure. The braces 9 may also be connected to the shock absorbing connector member through welding or any other appropriate method.

As discussed above, the braces 9 may each be shaped as two straight (and elongate) pieces as illustrated in FIG. 1. However, in some embodiments, the braces 9 may each be provided by curved members, for example concave or convex toward the seat 5, which may provide a better ergonomic fit for the user and may also serve to dissipate or redirect a force that may be associated with the user colliding or contacting the braces 9 during routine skiing activity or, as is often the case when skiing, during a fall. Additionally, the braces 9 may be positioned so as to provide separation between the user and the shock absorbing member 8 so as to prevent pinching of the user's leg, or any other part of the user that may be adjacent to the shock absorbing member. Although the embodiment of the skiing apparatus 100 illustrated in FIG. 1 depicts the braces 9 being connected to the upper shock absorbing connector members 11, those skilled in the art will appreciate that the present invention contemplates that each of the braces 9 may be directly connected to the upper frame member 1 and still accomplishing the goals, features, and advantages according to the present invention.

The skiing apparatus 100 according to embodiments of the present invention may also include a pair of upper shock absorbing connector members 11. Each of the upper shock absorbing connector members 11 may be connected to an upper portion of the opposing column members 13 of the upper frame member 1. More specifically, and as perhaps best illustrated in FIG. 1, each of the upper shock absorbing connector members 11 may be provided by a polygonal plate that is connected to the upper frame member 1 using a connector such as, for example, a nut/bolt, or a pin connector, or any other type of connector as may be understood by those skilled in the art after having had the benefit of reading this disclosure. The upper shock absorbing connector member 11 may also include a plurality of passageways formed therethrough. The plurality of passageways on each of the shock absorbing connector members 11 may be aligned with one another so that the connector may be passed through a passageway on each of the braces and through the passageways formed through the upper shock absorbing members to connect each of the braces 9 to the upper shock absorbing members. The plurality of passageways formed through each of the upper shock absorbing connector members 11 advantageously allows for the positioning between the lower seat member 2 and the upper frame member 1 to be changeable. This, in connection with the plurality of passageways formed through the lower shock absorbing member 12, may be used to further refine a desired angle of alignment between the lower seat member 2, the upper frame member 1 and the lower frame member 4.

In some embodiments, as illustrated in FIG. 1, the handle member 3 may be attached to the upper frame member 1. The handle member 3 may be fixed in relation to the upper frame member 1 so as to allow no relative movement therebetween. In some embodiments, the handle member 3 may be moveable in one or more directions relative to the upper frame member 1. For instance, the handle member 3 may be elastically moveable relative to the upper frame member 1 so as to absorb impact forces in one or more directions. The handle member 3 may also include one or more connectors to allow tilt, vertical, and horizontal adjustment so as to allow the handle member 3 to be adjusted as desired by the user. The handle member 3 may be attached to upper frame member 1 on the inside walls of columns 13.

The method of mounting the handle member 3, and the adjustment thereof, is not particularly limited. The mounting member 28 connecting the handle member 3 to the upper frame member may allow adjustment vertically and/or tilt toward and away from the user. The handle member may be a single member or may include a shaft 50, a connector 51, an extender 52 a clamp connector 53 and a handle bar 54, as illustrated in FIG. 1. This configuration can allow multiple locations at which to adjust vertical height (e.g., at connector 51 and mounting member 28), tilt (e.g., at clamp connector 52 and mounting member 28), and left and right handle centering (e.g., at clamp connector 52).

Figure 7:
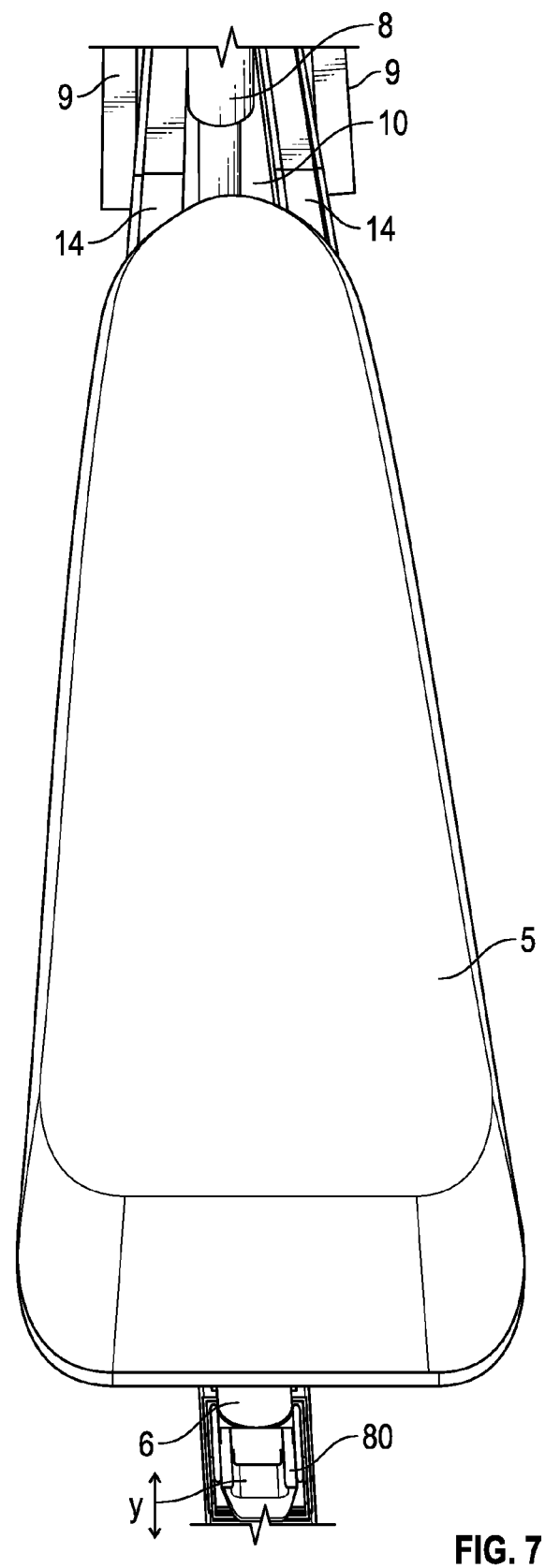
FIG. 7 is a partial top plan view of the skiing apparatus illustrated in FIG. 1 and showing an exemplary position of a seat and ski attachment area.

As illustrated in FIG. 6, the ski attachment member 6 may be connected to lower frame member 4. The connection type between lower frame member 4 and the ski attachment member 6 is not particularly limited. For instance, the ski attachment member 6 may have a plurality of aligned passageways 16 which may be connected to corresponding passageways formed in the lower frame member 4. The connector that may be used to connect the ski attachment member 6 to the lower frame member 4 may, for example, be a pin connector, a nut/bolt connector, or any other type of connector as understood by those skilled in the art after having had the benefit of this disclosure. The plurality of holes 16 may allow a change in relative angle α between the ski 7 and the lower frame member 4 and/or allow the ski attachment member 6 to be moved up and down the length of the lower frame member 4. It is also possible to connect the ski attachment member 6 and the lower frame member 4 through one or more intermediate members, a rail system, a positioning screw system, or any other acceptable method of connection. This may allow a variation in the position Y of the seat 5 over the ski attachment member 6 and ski binding 80, as shown in FIG. 7.

The ski attachment member 6 may be shaped so as to allow it to connect and be releasably attached to a conventional ski binding 80. This may allow the skiing apparatus 100 to permit the ski 7 to be easily removed or changed out. This can be useful for transportation, changing ski type, damage to a ski, etc.

However, while the ski attachment member 6 has been illustrated as an adjustable member which may fit into an existing ski binding 80, the shape of the ski attachment member 6 and ski connection method is not particularly limited. For instance, the ski attachment member 6 may be shaped to match the shape of the ski binding, a ski boot, etc., or may have a shape or fitting designed to attach to a custom fitting on a ski 7. The use of a custom fitting may allow the ski attachment member 6 to be more securely fixed to a ski 7, allow more degrees of movement/adjustment, etc. Indeed, the ski 7 may be fixed to ski attachment member 6 so as to not be removable without the use of tools. In addition, in some embodiments, the ski attachment member 6 may also include a dampening material or allow a range of motion between the ski attachment member 6 and ski 7.

Figure 8:
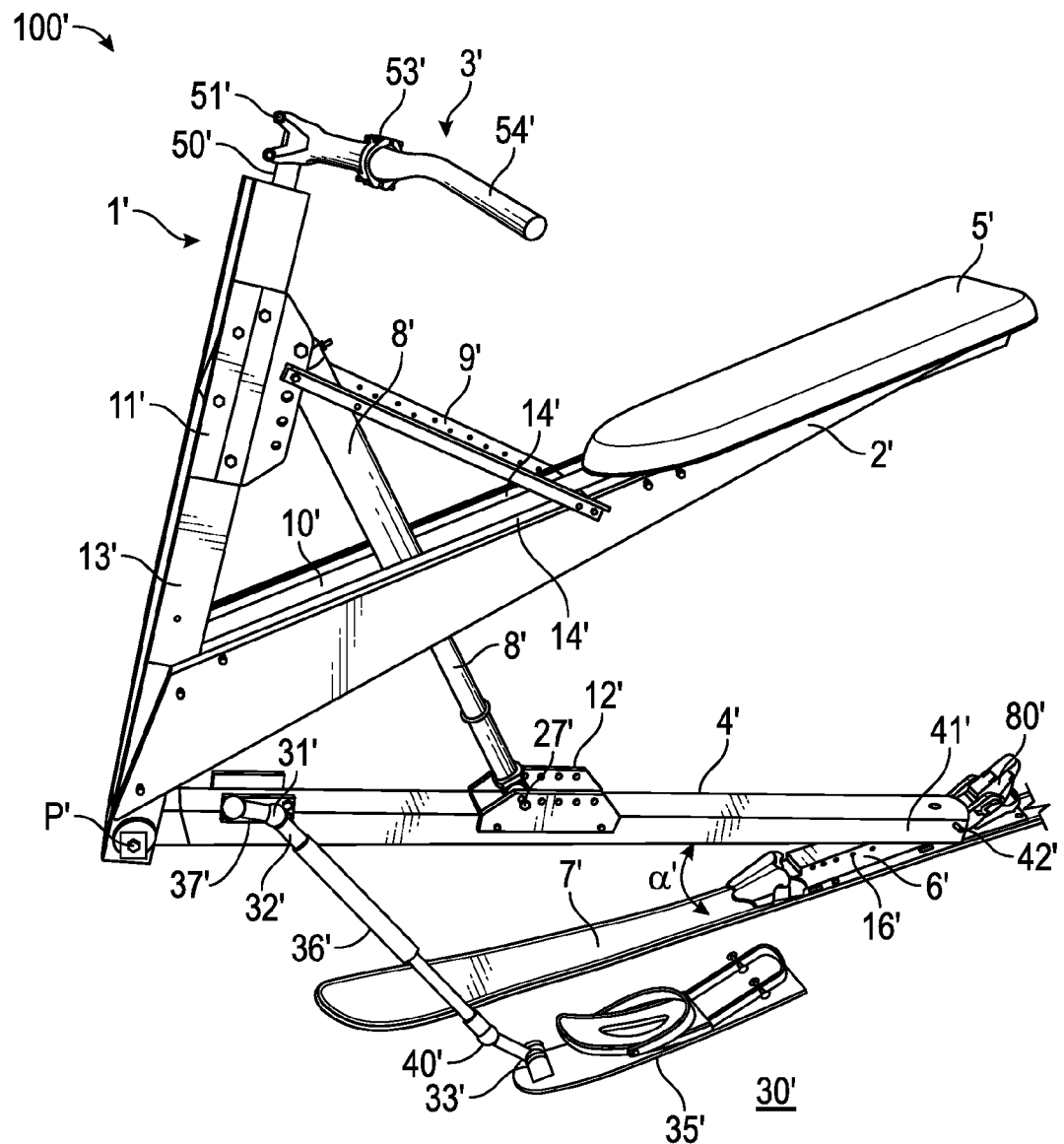
FIG. 8 is a perspective view of another embodiment of a skiing apparatus according to an embodiment of the present invention and having attached foot skis.
Figure 9:
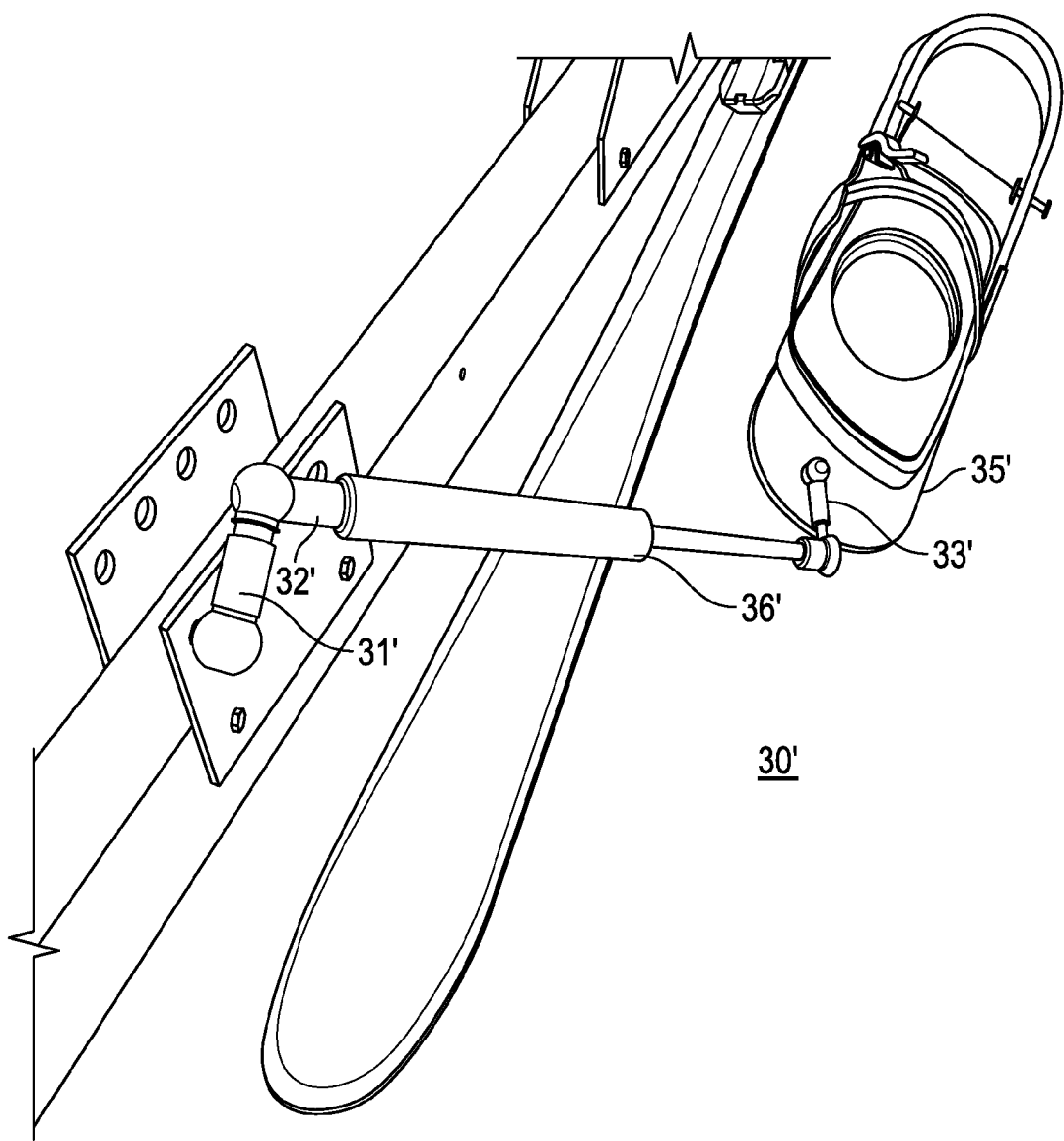
FIG. 9 is a perspective of an attached foot ski illustrated in FIG. 8.

As illustrated in FIGS. 8 and 9, in some embodiments, a ski apparatus 100' may include attached foot ski assemblies 30' (e.g., one or two assemblies). Referring now to FIGS. 8 and 9, the foot ski assemblies 30' will be discussed. All other elements are similar to those of FIGS. 1-7. Thus, like elements will be labeled with a prime symbol (e.g., 2') and will not be discussed.

The built in foot ski assemblies 30' may provide additional stability. This may be especially useful for riders with physical limitations or beginners. The foot ski assemblies 30' may connect to the lower frame member 4' through a first connector 31' (e.g., a ball joint(s), pivoting connectors, etc.). A strut 32' extends from the first connector 31' to a second connector 40' and 33' (e.g., ball joints, elastic material, rigid connector, limited range of movement connector, etc.) attached to the foot ski 35'. The foot ski assembly 30' may include a variable length member 36' (such as a gas spring) so as to allow the foot ski 30' to readily follow/compensate for the terrain. The first and second connectors 31' and 33' may also allow the foot ski 35' to follow the terrain.

The design of the foot ski strut 32' is not particularly limited. For instance, one end of strut 32' may pivotally attach to lower frame member 4' through connector 31' at a forward position and the other end of strut 32' may connect to the foot ski 35'. The strut 32' may include a spring member 36' (e.g., a gas spring). One or both of the strut 32' and the spring member 36' may be attached to the lower frame 4' through an intermediate outrigger, such as outrigger 37'. Thus, the foot ski 35' may be able to follow the terrain and allow better stability for the rider.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A skiing apparatus comprising:
   an upper frame member;
   a lower seat member connected to the upper frame member;
   a handle member connected to the upper frame member in fixed relation to the lower seat member;
   a lower frame member connected to the upper frame member;
   a ski attachment member connected to the lower frame member and adapted to be detachably connected to a ski;
   an upper shock absorbing connector member connected to the upper frame member; and
   a lower shock absorbing connector member connected to the lower frame member.

2. The skiing apparatus according to claim 1 further comprising a shock absorbing member extending between the lower frame member and the upper frame member.

3. The skiing apparatus according to claim 2 wherein the shock absorbing member comprises an upper end adapted to be connected to the upper shock absorbing connector member, and a lower end adapted to be connected to the lower shock absorbing member.

4. The skiing apparatus according to claim 3 wherein the upper shock absorbing connector comprises a first portion adapted to be connected to the upper frame member and a pair of second portions that extend outwardly from the first portion; and wherein each of the pair of second portions includes a plurality of spaced apart pairs of aligned passageways formed therethrough, each of the plurality of spaced apart pairs of aligned passageways adapted to receive a portion of the upper end of the shock absorbing member.

5. The skiing apparatus according to claim 3 wherein the lower shock absorbing connector comprises a first portion adapted to be connected to the lower frame member and a pair of second portions that extend upwardly from the first portion; and wherein each of the pair of second portions includes a plurality of spaced apart pairs of aligned passageways formed therethrough, each of the plurality of spaced apart pairs of aligned passageways adapted to receive a portion of the lower end of the shock absorbing member.

6. The skiing apparatus according to claim 3 wherein the upper end of the shock absorbing member is pivotally connected to the upper shock absorbing connector; and wherein the lower end of the shock absorbing member is pivotally connected to the lower shock absorbing connector.

7. The skiing apparatus according to claim 1 wherein the upper frame member is pivotally connected to the lower frame member.

8. The skiing apparatus according to claim 1 wherein a seat is fixedly connected to the lower seat member.

9. The skiing apparatus according to claim 1 wherein the ski attachment member is fixedly connected to the lower frame member.

10. The skiing apparatus according to claim 1 further comprising a brace member extending between a portion of the upper shock absorbing connector member and the lower seat member.

11. The skiing apparatus according to claim 1 wherein the ski attachment member is adapted to be detachably connected to a ski binding of the ski.

12. The skiing apparatus according to claim 7 wherein the upper frame and lower frame are pivotally connected so as to allow between 2 and 45 degrees of movement therebetween.

13. The skiing apparatus according to claim 1 wherein the upper frame member and the lower seat member are integrally formed as a monolithic unit.

14. The skiing apparatus according to claim 1 further comprising a foot ski assembly, the foot ski assembly comprising:
   a foot ski;
   a plurality of ball joints; and
   a gas spring strut, an end of the gas spring strut being connected to the foot ski and the other end of the gas spring strut being connected by the plurality of ball joints to the lower frame member between the ski attachment member and the upper member.

15. A skiing apparatus comprising:
an upper frame member;
a lower seat member connected permanently fixed to the upper frame member so that the upper frame member and the lower seat member are integrally formed as a monolithic unit;
a handle member connected to the upper frame member;
a lower frame member connected to the upper frame member;
a ski attachment member connected to the lower frame member;
a ski connected to the ski attachment member;
an upper shock absorbing connector member connected to the upper frame member; and
a lower shock absorbing connector member connected to the lower frame member.

16. The skiing apparatus according to claim 15 wherein the ski is configured so as to be detachable from the ski attachment member.

17. The skiing apparatus according to claim 15 further comprising a shock absorbing member configured so as to allow between 2 and 45 degrees of relative movement between the upper frame and the lower frame.

18. The skiing apparatus according to claim 17 wherein the shock absorbing member comprises a dampener.

19. A skiing apparatus comprising:
an upper frame member;
a lower seat member connected to the upper frame member;
a handle member connected to the upper frame member;
a handlebar fixed to the handle member;
a lower frame member pivotally connected to the upper frame member;
a ski attachment member adjustably connected to the lower frame member so as to allow relative adjustment between the ski attachment member and the lower frame member;
a ski connected to the ski attachment member;
an upper shock absorbing connector member connected to the upper frame member;
a lower shock absorbing connector member connected to the lower frame member;
a shock absorbing member extending between the lower frame member and the upper frame member; and
a brace extending between a portion of the handle member and the lower seat member such that the handle member is fixed relative to the lower set member.

* * * * *